United States Patent
Lei et al.

(10) Patent No.: US 7,853,021 B2
(45) Date of Patent: Dec. 14, 2010

(54) DECODING APPARATUS AND DECODING METHOD FOR MULTIPLE AUDIO STANDARDS

(75) Inventors: Yung-Chun Lei, Hsin-Chu (TW); Tzueng-yau Lin, Hsin-Chu (TW)

(73) Assignee: MediaTek Inc., Hsin-Chu (TW)

( * ) Notice: Subject to any disclaimer, the term of this patent is extended or adjusted under 35 U.S.C. 154(b) by 1351 days.

(21) Appl. No.: 11/081,510

(22) Filed: Mar. 17, 2005

(65) Prior Publication Data

US 2006/0210088 A1 Sep. 21, 2006

(30) Foreign Application Priority Data

Mar. 19, 2004 (TW) .............................. 93107585 A

(51) Int. Cl.
*H04H 20/47* (2008.01)
*H04H 20/88* (2008.01)
*H04H 40/36* (2008.01)

(52) U.S. Cl. .................. 381/2; 381/1; 381/22; 455/208
(58) Field of Classification Search ................ 381/1–4, 381/22, 13; 348/737, 738; 455/130, 208, 455/296, 312; 700/94
See application file for complete search history.

(56) References Cited

U.S. PATENT DOCUMENTS

| | | | | |
|---|---|---|---|---|
| 4,893,316 A | * | 1/1990 | Janc et al. | 708/300 |
| 4,907,082 A | * | 3/1990 | Richards | 348/485 |
| 5,375,146 A | * | 12/1994 | Chalmers | 375/350 |
| 5,581,617 A | * | 12/1996 | Schotz et al. | 381/14 |
| 6,037,993 A | * | 3/2000 | Easley | 348/485 |
| 6,147,713 A | * | 11/2000 | Robbins et al. | 348/555 |
| 6,281,813 B1 | | 8/2001 | Vierthaler | |
| 6,492,913 B2 | | 12/2002 | Vierthaler | |
| 2002/0126703 A1 | | 9/2002 | Kovacevic | 370/487 |
| 2003/0162517 A1 | | 8/2003 | Wu | 455/237.1 |
| 2003/0197810 A1 | | 10/2003 | Jaffe | 348/726 |

OTHER PUBLICATIONS

William Kerins, "Spur Levels in Multiple-Bit DRFMs", Journal of Electronic Defense, Jan. 1991, pp. 49-54.

* cited by examiner

*Primary Examiner*—Xu Mei
*Assistant Examiner*—Jason R Kurr
(74) *Attorney, Agent, or Firm*—Patterson & Sheridan, LLP

(57) ABSTRACT

The invention discloses a decoding apparatus for decoding an analog audio signal. The decoding apparatus includes an RF tuner, an analog to digital (A/D) converter, a digital down converter, and a programmable digital signal processor (DSP). The RF tuner is used for receiving the analog audio signal and for providing an analog sound intercarrier frequency (SIF) signal indicative thereof. The analog to digital (A/D) converter is used for sampling the analog SIF signal and for converting the signal into a digital SIF signal. The digital down converter is used for down converting the digital SIF signal to generate a baseband signal. The programmable digital signal processor (DSP) is used for demodulating the baseband signal according to a demodulation procedure of a predetermined standard and decoding the demodulated baseband signal to output an output signal in compliance with a decoding procedure of the predetermined standard.

12 Claims, 8 Drawing Sheets

DECODING APPARATUS AND DECODING METHOD FOR MULTIPLE AUDIO STANDARDS

BACKGROUND OF THE INVENTION

1. Field of the Invention

The invention relates to a decoding apparatus for audio signals and the method thereof, especially to a decoding apparatus for multiple audio signals and the method thereof.

2. Description of the Prior Art

According to the prior art, the audio signals applied in televisions and video systems include a lot of different coding/decoding standards, e.g. the broadcast television system committee (BTSC) standard applied in America, the FM/FM standard applied in Japan, the A2 standard, and so on.

Please refer to FIG. 1. FIG. 1 is a schematic diagram of a decoding apparatus 10 for audio signals in compliance with the BTSC standard according to the prior art. The decoding apparatus 10 for audio signals in compliance with the BTSC standard according to the prior art includes an RF tuner 12, an A/D converter 14, a processor 16, and a digital BTSC decoder 18.

The RF tuner 12 is used for receiving a BTSC analog audio signal 20 and converting the BTSC analog audio signal 20 to a BTSC analog sound intercarrier frequency (SIF) signal 22. The A/D converter 14 is used for converting the BTSC analog sound intercarrier frequency (SIF) signal 22 to a BTSC digital SIF signal 24. The processor 16 is used for calculating to obtain a multi-channel television sound (MTS) demodulated signal 26 according to the inputted BTSC digital SIF signal 24. The MTS demodulated signal 26 includes a summed L+R audio output signal and a difference L−R audio output signal 30. The digital BTSC decoder 18 is used for decoding the MTS demodulated signal 26 and for generating a summed L+R audio output signal 28 and a difference L−R audio output signal 30 according to the demodulation/decoding procedure of the BTSC standard.

According to the prior art, each of the decoding apparatus for audio signals applied in televisions and video systems is in compliance with each of the different coding/decoding standards respectively, so that it is inconvenient to develop different circuit designs for all the different audio signals. Therefore, it is necessary to provide a decoding apparatus for multiple audio signal standards and method thereof to improve flexibility of circuit design for decoding audio signals.

SUMMARY OF THE INVENTION

Therefore, the embodiment is to provide a decoding apparatus for audio signals and the method thereof, especially relating to a decoding apparatus for multiple audio signal standards and the method thereof. The other embodiment of the invention is to provide a decoding apparatus for audio signals and the method thereof to improve the flexibility of circuit design for decoding audio signals.

The decoding apparatus of the embodiment is used for decoding an analog audio signal. The decoding apparatus includes an RF tuner, an A/D converter, a digital down converter, and a programmable digital signal processor.

The RF tuner is used for receiving the analog audio signal and providing an analog sound intercarrier frequency (SIF) signal indicative thereof. The analog audio signal is an analog signal, and the carrier center frequency of the analog audio signal is a first carrier frequency (Cf1). The analog SIF signal is also an analog signal, and the carrier center frequency of the analog SIF signal is a second carrier frequency (Cf2). The analog to digital (A/D) converter is used for sampling the analog SIF signal at a sample rate at least twice as fast as the second carrier frequency and converting the signal into a digital SIF signal. The digital down converter is used for down converting the digital SIF signal to generate a baseband signal. The programmable digital signal processor is used for demodulating the baseband signal according to a demodulation procedure of a predetermined standard and decoding the demodulated baseband signal to output an output signal in compliance with a decoding procedure of the predetermined standard.

The corresponding demodulation and decoding program is employed in the programmable digital signal processor for output signals with different standards, e.g. the broadcast television system committee (BTSC) standard applied in America, the FM/FM standard applied in Japan, the A2 standard, and so on, so that the programmable digital signal processor performs the corresponding demodulation and decoding program on the signals with different standards to maintain flexibility for each standard.

According to the invention, the decoding apparatus can perform the corresponding demodulation and decoding program procedure with different standards. Therefore, the decoding apparatus of the invention is a decoding apparatus for multiple audio signal standards. Moreover, the decoding apparatus of the invention has a compensative function for frequency shift.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
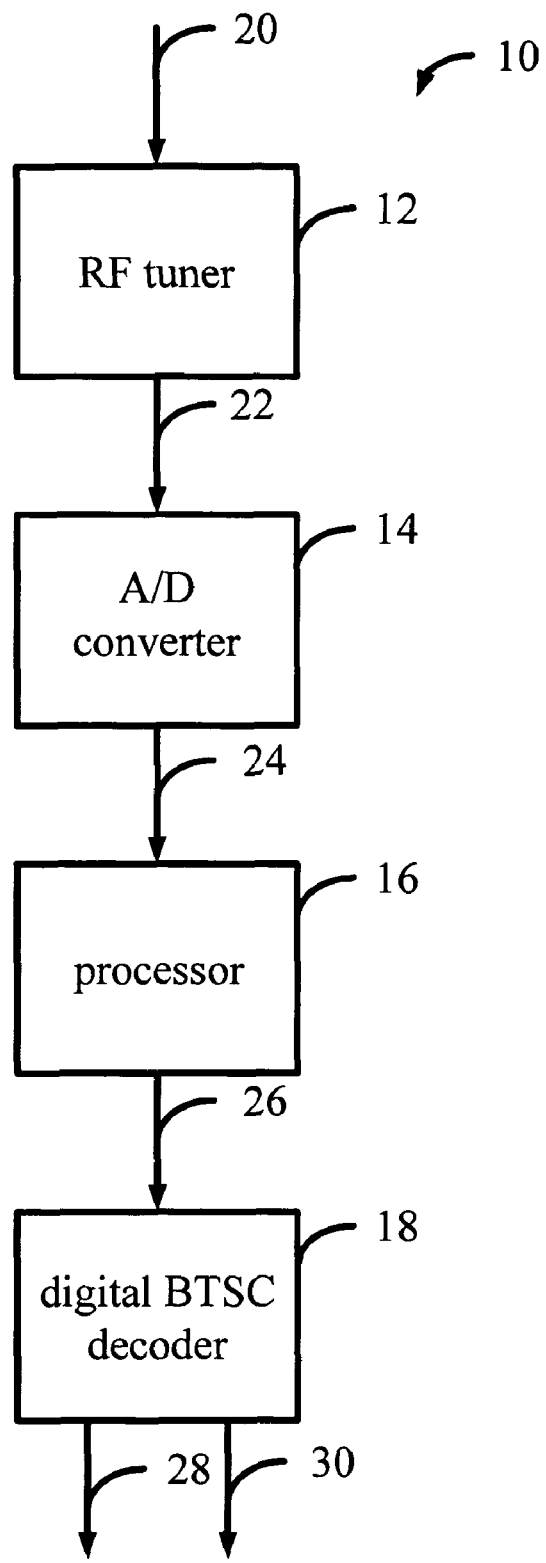
FIG. 1 is a schematic diagram of a decoding apparatus for audio signals in compliance with the BTSC standard according to the prior art.
Figure 2:
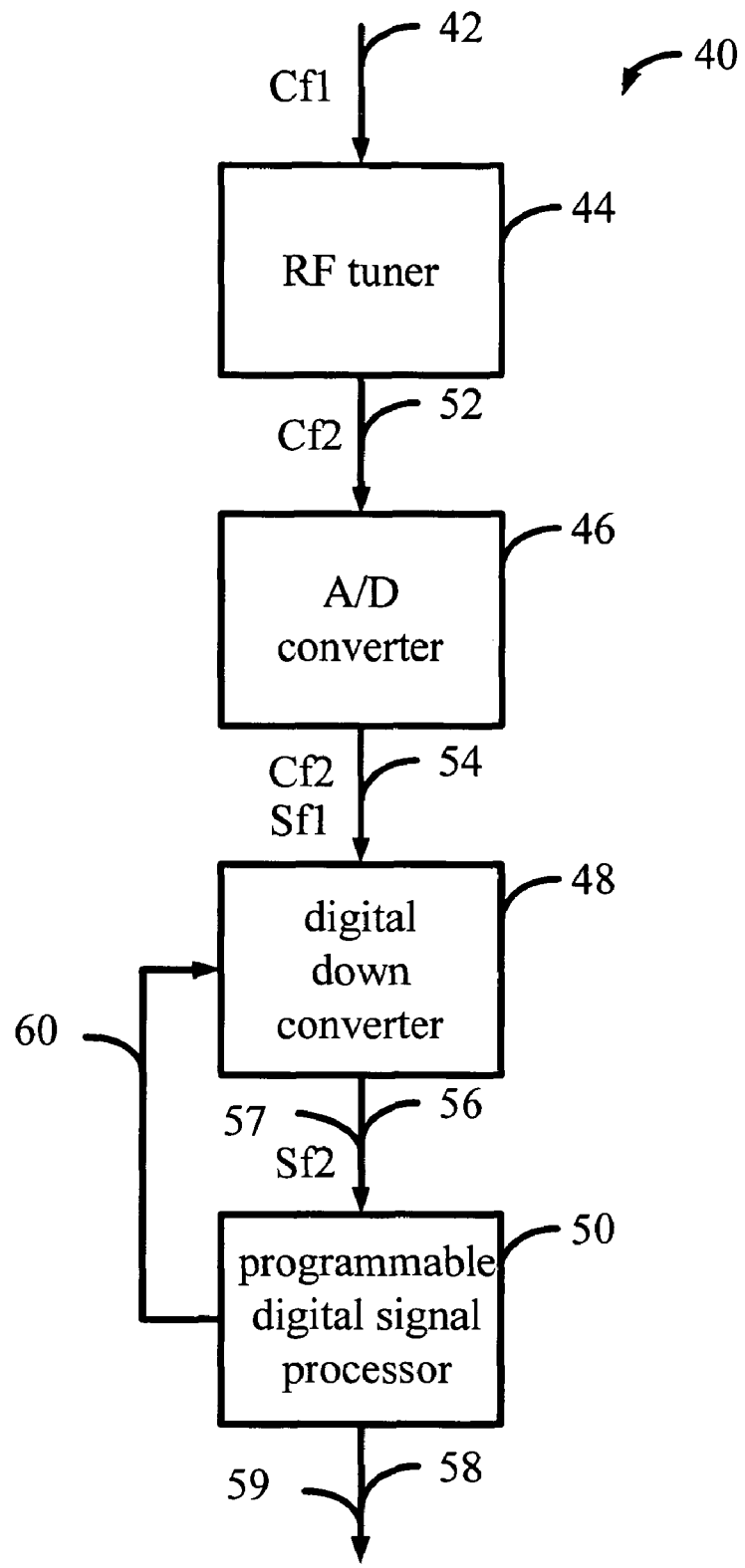
FIG. 2 is a schematic diagram of the decoding apparatus of the first embodiment according to the invention.

Please refer to FIG. 2. FIG. 2 is a schematic diagram of the decoding apparatus 40 of the first embodiment according to the invention. The decoding apparatus 40 of this embodiment is used for decoding an analog audio signal 42. The decoding apparatus 40 includes an RF tuner 44, an A/D converter 46, a digital down converter 48, and a programmable digital signal processor 50.

The RF tuner 44 is used for receiving the analog audio signal 42 and providing an analog sound intercarrier frequency (SIF) signal 52 indicative thereof. The analog audio signal 42 is an analog signal, and the carrier center frequency of the analog audio signal 42 is a first carrier frequency (Cf1).

In this embodiment, the range of the first carrier frequency (Cf1) is between 10 MHz and 1 GHz (1000 MHz). The analog SIF signal 52 is also an analog signal, and the carrier center frequency of the analog SIF signal 52 is a second carrier frequency (Cf2). In this embodiment, the range of the second carrier frequency (Cf2) is between 4 MHz and 12 MHz.

The A/D converter 46 is used for sampling the analog SIF signal 52 at a sample rate at least twice as fast as the second carrier frequency (Cf2) and for converting the signal into a digital SIF signal 54. The digital SIF signal 54 is a digital signal; the carrier center frequency of the digital SIF signal 54 substantially remains at the same frequency as the analog SIF signal 52 (in this embodiment, the frequency is between 4 MHz and 12 MHz), and the sample frequency of the digital SIF signal 54 is the first sample frequency (Sf1). In this embodiment, the first sample frequency (Sf1) is at least twice as fast as the second carrier frequency (Cf2). Therefore, if the range of the second carrier frequency (Cf2) is between 4 MHz and 12 MHz, the first sample frequency (Sf1) is at least 8 MHz.

The digital down converter 48 is used for down converting the digital SIF signal 54 to generate a baseband signal 56. The programmable digital signal processor 50 is used for demodulating the baseband signal 56 according to a demodulation procedure of a predetermined standard and for decoding the demodulated baseband signal to output an output signal 58 in compliance with a decoding procedure of the predetermined standard.

Figure 3:
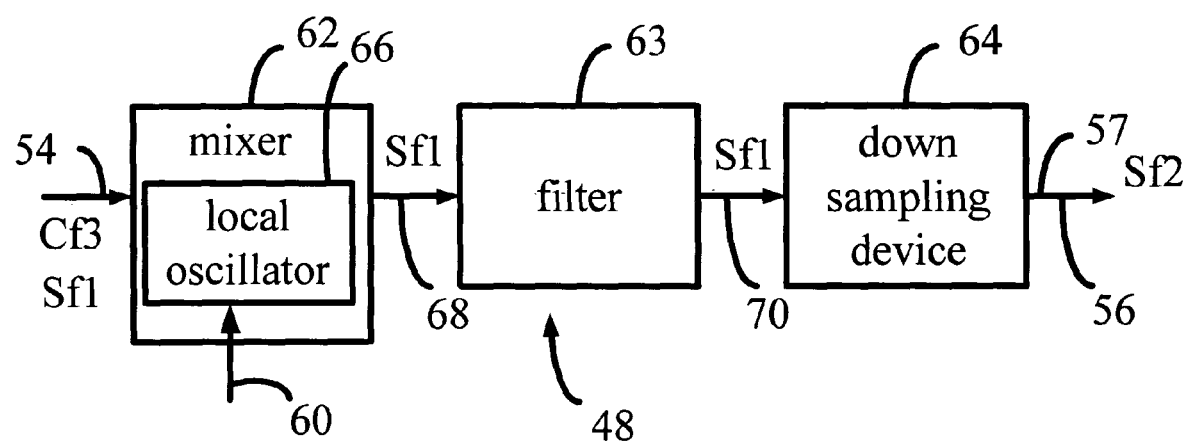
FIG. 3 is a schematic diagram of the digital down converter shown in FIG. 2.

Please refer to FIG. 3. FIG. 3 is a schematic diagram of the digital down converter 48 shown in FIG. 2. The digital down converter 48 includes a mixer 62, a filter 63, and a down sampling device 64. The mixer 62 includes a local oscillator 66. The mixer 62 is used for mixing the digital SIF signal 54 with a local oscillation signal (not shown) generated by the local oscillator 66 to generate a mixed digital SIF signal 68 and remove the carrier of the digital SIF signal 54. The mixed digital SIF signal 68 is a digital signal; the carrier of the mixed digital SIF signal 68 is removed, and the sample frequency of the mixed digital SIF signal 68 remains at the same frequency as the digital SIF signal 54 (in this embodiment, the frequency exceeds 8 MHz). The filter 63 is used for filtering the noise of the mixed digital SIF signal 68 to generate a filter signal 70. The down sampling device 64 is used for reducing the sample numbers of the filter signal 70 to generate the baseband signal 56. The baseband signal 56 is a digital signal, and the sample frequency of the baseband signal 56 is lower than the mixed digital SIF signal 68 since it has been processed by the down sampling device 64. The sample frequency of the baseband signal 56 is the second sample frequency (Sf2). In this embodiment, the second sample frequency (Sf2) is lower than 4 MHz.

Figure 4:
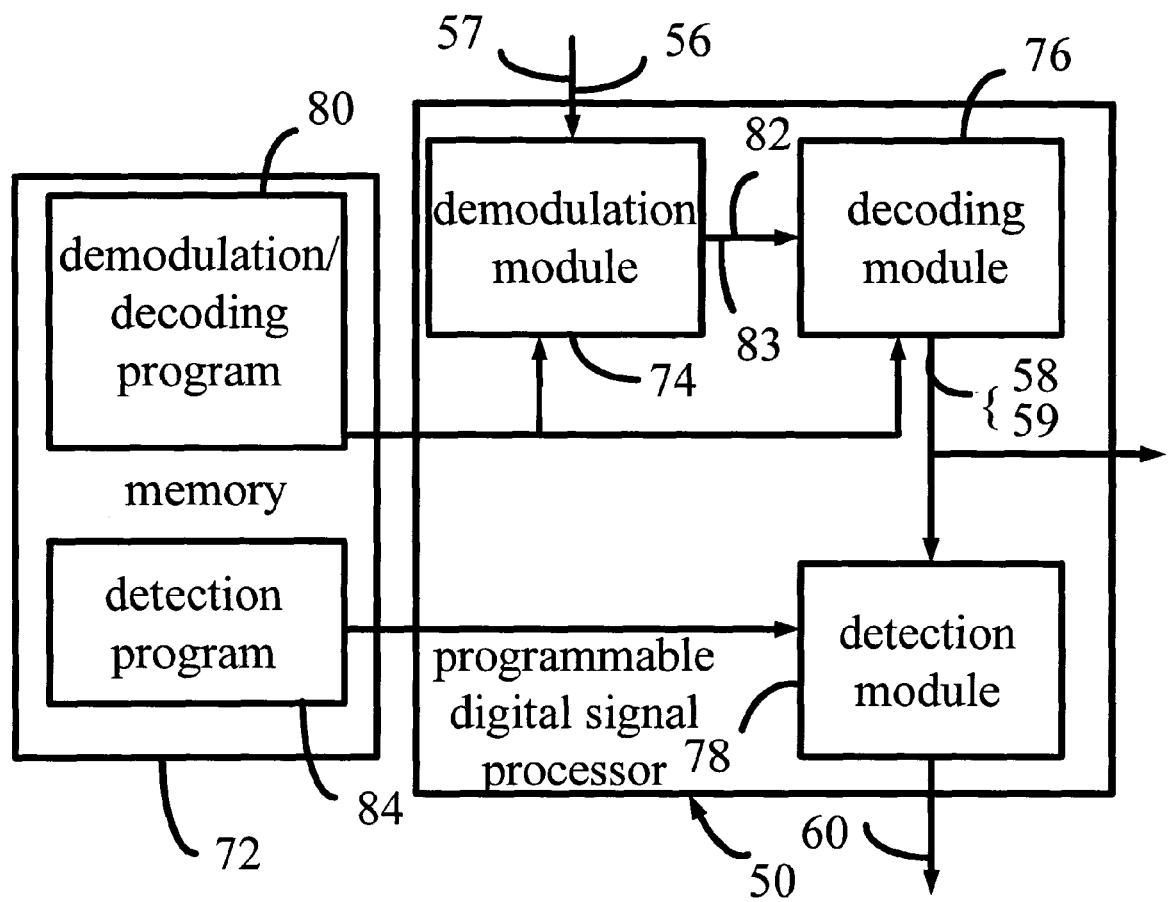
FIG. 4 is a functional block diagram of the programmable digital signal processor shown in FIG. 2.

Please refer to FIG. 4. FIG. 4 is a functional block diagram of the programmable digital signal processor 50 shown in FIG. 2. The programmable digital signal processor 50 includes a demodulation module 74, a decoding module 76, and a detection module 78. The memory 72 external to the programmable digital signal processor 50 is used for storing at least one demodulation and decoding program 80. The demodulation and decoding program 80 is used for performing the demodulation and decoding procedure of the predetermined standard on the baseband signal 56 to demodulate the baseband signal 56, to decode the demodulated baseband signal 56, and to output the output signal in compliance with the predetermined standard. It has to be mentioned that because this embodiment utilizes the programmable digital signal processor, the demodulation module 74, the decoding module 76, and the detection module 78 are all put into applications operated by the programs running on the digital signal processor instead of using exclusive hardware circuit.

The demodulation module 74 demodulates the baseband signal 56 by the demodulation program within demodulation and decoding program 80. The decoding module 76 decodes the demodulated baseband signal 82 by the decoding program within demodulation and decoding program 80 and outputs the output signal 58 in compliance with the predetermined standard.

The output signal 58 can be applied in the broadcast television system committee (BTSC) standard in America, the FM/FM standard in Japan, the A2 standard, and so on. The corresponding demodulation and decoding program 80 is employed in the programmable digital signal processor 50 for the output signal 58 with a different standard, so that the programmable digital signal processor 50 performs the corresponding demodulation and decoding program 80 on the signals with different standards to maintain flexibility for each standard.

Compared with the decoding apparatus 10 for audio signals of the prior art, the decoding apparatus 10 can only be adopted by the demodulation and decoding program procedure with one single standard. The decoding apparatus 40 of the invention can perform the corresponding demodulation and decoding program procedure according to different standards. Therefore, the decoding apparatus 40 of the invention is a decoding apparatus 40 for multiple audio signal standards.

Please refer to FIG. 2 through FIG. 4. The programmable digital signal processor 50 further includes a detection program 84 for detecting an average level value of the output signal 58 and outputs a carrier recovery signal 60 to the mixer 62 when the average level value does not comport with a predetermined standard level value, so as to adjust the oscillation frequency of the local oscillation signal of the local oscillator 66 to enable outputting of an adjusted baseband signal 57 by the digital down converter 48.

The programmable digital signal processor 50 performs the demodulation and decoding procedure of the predetermined standard for demodulating the adjusted baseband signal 57 and decoding the demodulated and adjusted baseband signal 83 to output the adjusted output signal 59 in compliance with the predetermined standard; the average level value of the adjusted output signal 59 comports with the predetermined standard level value.

Compared with the decoding apparatus 10 for audio signals of the prior art, the decoding apparatus 40 of the invention has the compensative function for frequency shift. In the decoding procedure for audio signals, due to the error of electronic parts or environmental factors (e.g. temperature), the quality of the output signals will be affected by frequency shift. The decoding apparatus 40 of the invention achieves the compensative function for frequency shift by the detection module 78, the detection program 84, and other relative effects.

Figure 5:
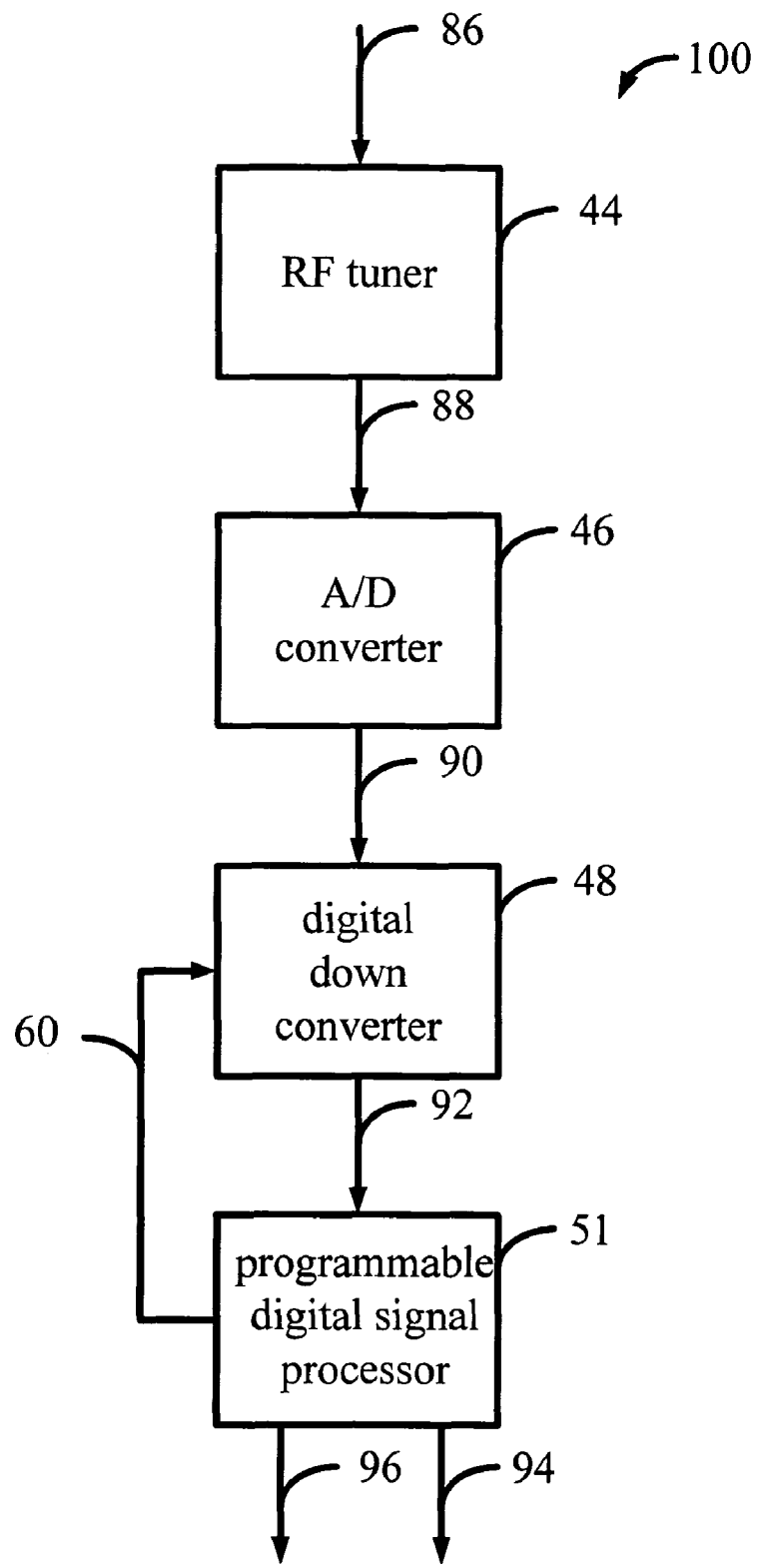
FIG. 5 is a schematic diagram of the decoding apparatus of the second embodiment according to the invention.
Figure 6:
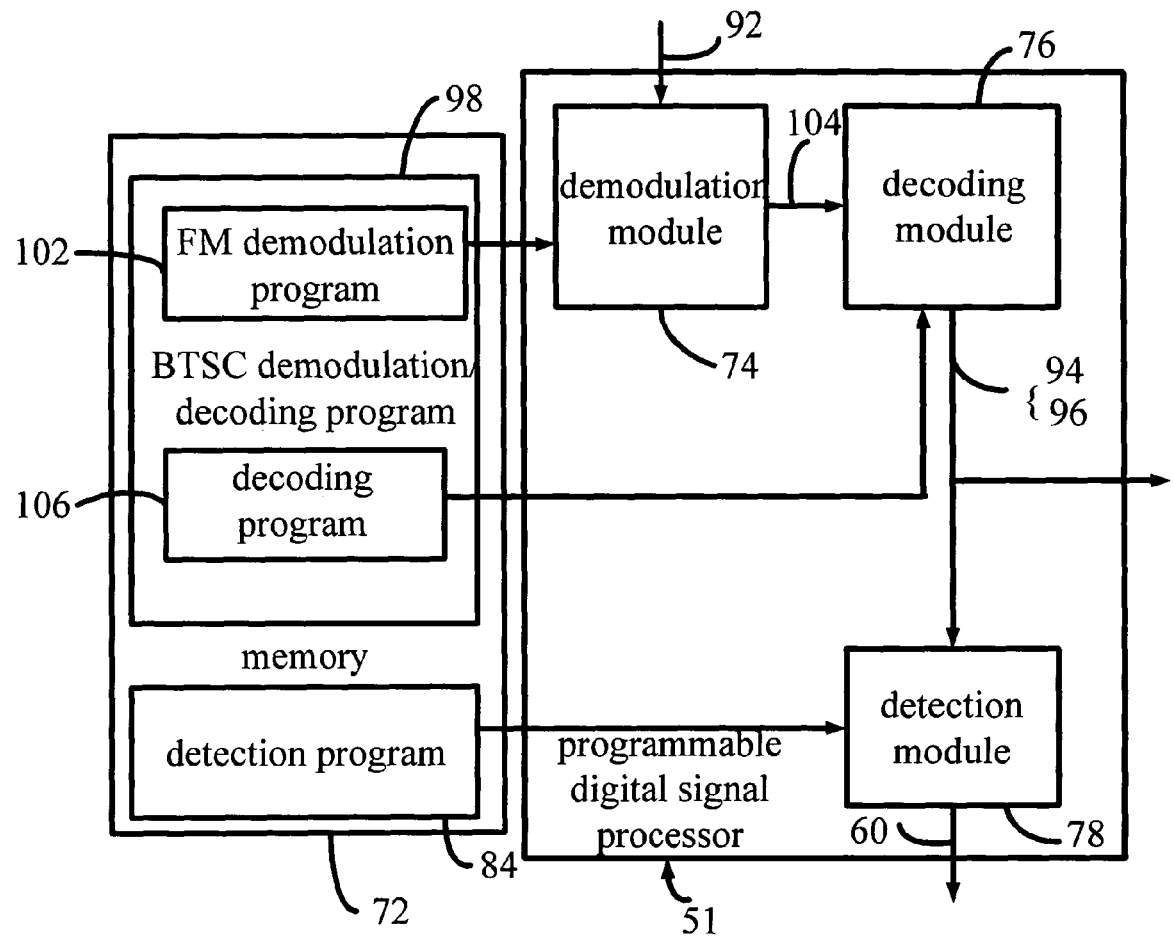
FIG. 6 is a functional block diagram of the programmable digital signal processor shown in FIG. 5.

Please refer to FIG. 5 and FIG. 6. FIG. 5 is a schematic diagram of the decoding apparatus 100 of the second embodiment according to the invention. FIG. 6 is a functional block diagram of the programmable digital signal processor 51 shown in FIG. 5. According to the invention, the decoding apparatus 100 of the second embodiment is used for decoding a BTSC analog audio signal 86 in compliance with the BTSC standard. The programmable digital signal processor 51 of the decoding apparatus 100 performs the functions according to a demodulation and decoding procedure in compliance with the BTSC standard. The BTSC analog audio signal 86 is inputted into the RF tuner 44 to generate a BTSC analog SIF signal 88. The BTSC analog SIF signal 88 is inputted into the A/D converter 46 to generate a BTSC digital SIF signal 90. The BTSC digital SIF signal 90 is inputted into the digital down converter 48 to generate a BTSC baseband signal 92. Furthermore, the BTSC baseband signal 92 is inputted into the programmable digital signal processor 51 to output a summed L+R audio output signal 94 and a difference L−R audio output signal 96.

As shown in FIG. 6, in the memory 72 external to the programmable digital signal processor 51, the demodulation and decoding program 98 is a BTSC demodulation and decoding program. The BTSC demodulation and decoding program 98 includes an FM demodulation program 102 for demodulating the BTSC baseband signal 92 and generating a multichannel television sound (MTS) demodulated signal 104. The BTSC demodulation and decoding program 98 further includes a decoding program 106 for decoding the MTS demodulated signal 104 and generating the summed L+R audio output signal 94 and the difference L−R audio output signal 96.

Figure 7:
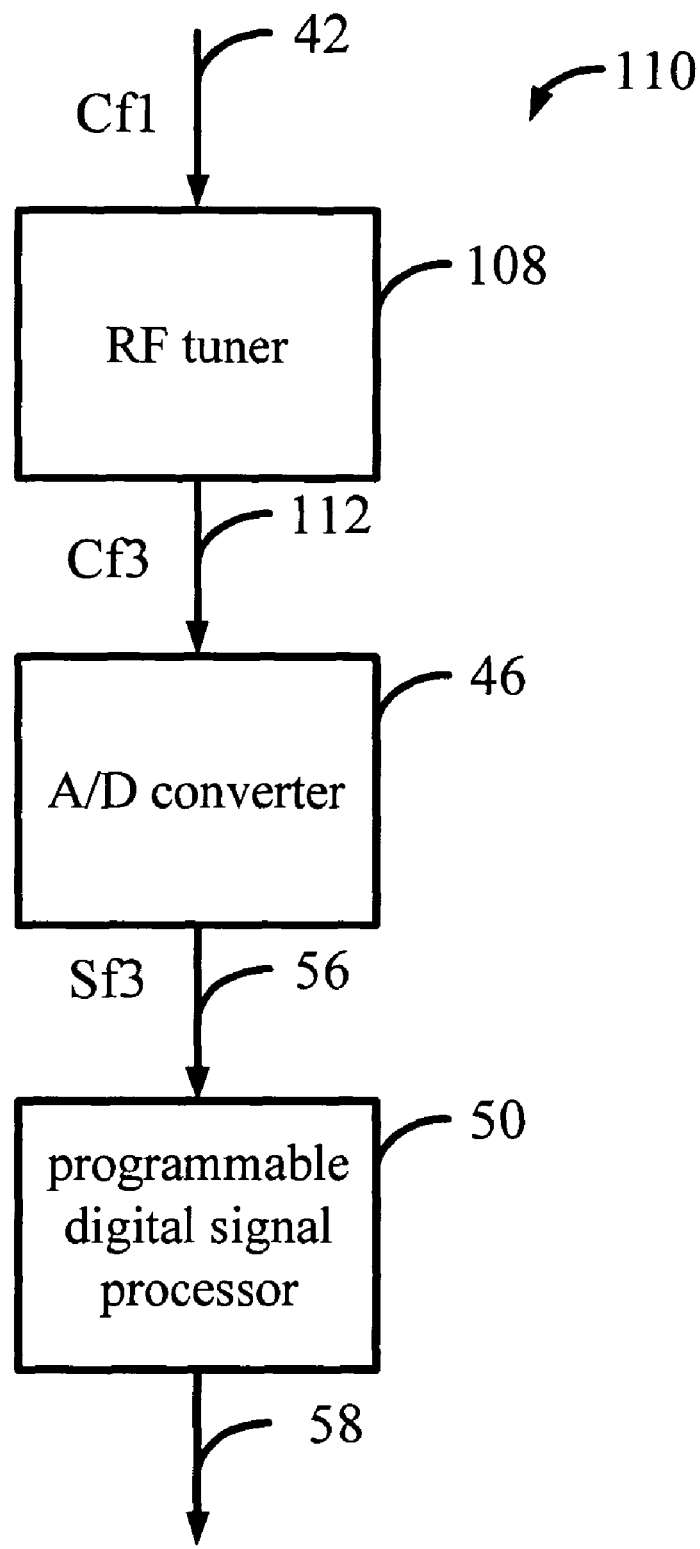
FIG. 7 is a schematic diagram of the decoding apparatus of the third embodiment according to the invention.

Please refer to FIG. 7. FIG. 7 is a schematic diagram of the decoding apparatus 110 of the third embodiment according to the invention. The main difference between the decoding apparatus 110 of the third embodiment and the decoding apparatus 40 of the first embodiment is the RF tuner. The RF tuner 108 of the decoding apparatus 110 is used for receiving the analog audio signal 42 and for providing an analog sound baseband frequency signal 112 indicative thereof. The analog audio signal 42 is an analog signal, and the carrier center frequency of the analog audio signal 42 is a first carrier frequency (Cf1). In this embodiment, the range of the first carrier frequency (Cf1) is between 10 MHz and 1 GHz (1000 MHz). The analog sound baseband frequency signal 112 is also an analog signal, and the carrier center frequency of the analog sound baseband frequency signal 112 is reduced from the first carrier frequency (Cf1) to the third carrier frequency (Cf3). In this embodiment, the range of the third carrier frequency (Cf3) is lower than 2 MHz. The A/D converter 46 is used for sampling the analog sound baseband frequency signal 112 at a sample rate at least twice as fast as the third carrier frequency (Cf3) and for converting the signal into a baseband signal 56. The baseband signal 56 is a digital signal, and the sample frequency of the baseband signal 56 is the third sample frequency Sf3. In this embodiment, the third sample frequency Sf3 is lower than 4 MHz.

For further description, according to the invention, RF tuner 108 of the decoding apparatus 110 of the third embodiment is different from the RF tuner 44 of the decoding apparatus 40 of the first embodiment and the decoding apparatus 100 of the second embodiment. After receiving the analog audio signal 42, the RF tuner 108 directly converts the analog audio signal 42 with a carrier center frequency as the first carrier frequency (Cf1) to the analog sound baseband frequency signal 112 with a carrier center frequency as the third carrier frequency (Cf3), wherein the range of the third carrier frequency (Cf3) in the third embodiment is lower than 2 MHz, and the analog sound baseband frequency signal 112 is a baseband signal. Therefore, the third embodiment doesn't need a digital down converter to reduce the carrier frequency. In other words, compared with the decoding apparatus 40 of the first embodiment and the decoding apparatus 100 of the second embodiment, the decoding apparatus 110 of the third embodiment doesn't have the digital down converter 48.

Figure 8:
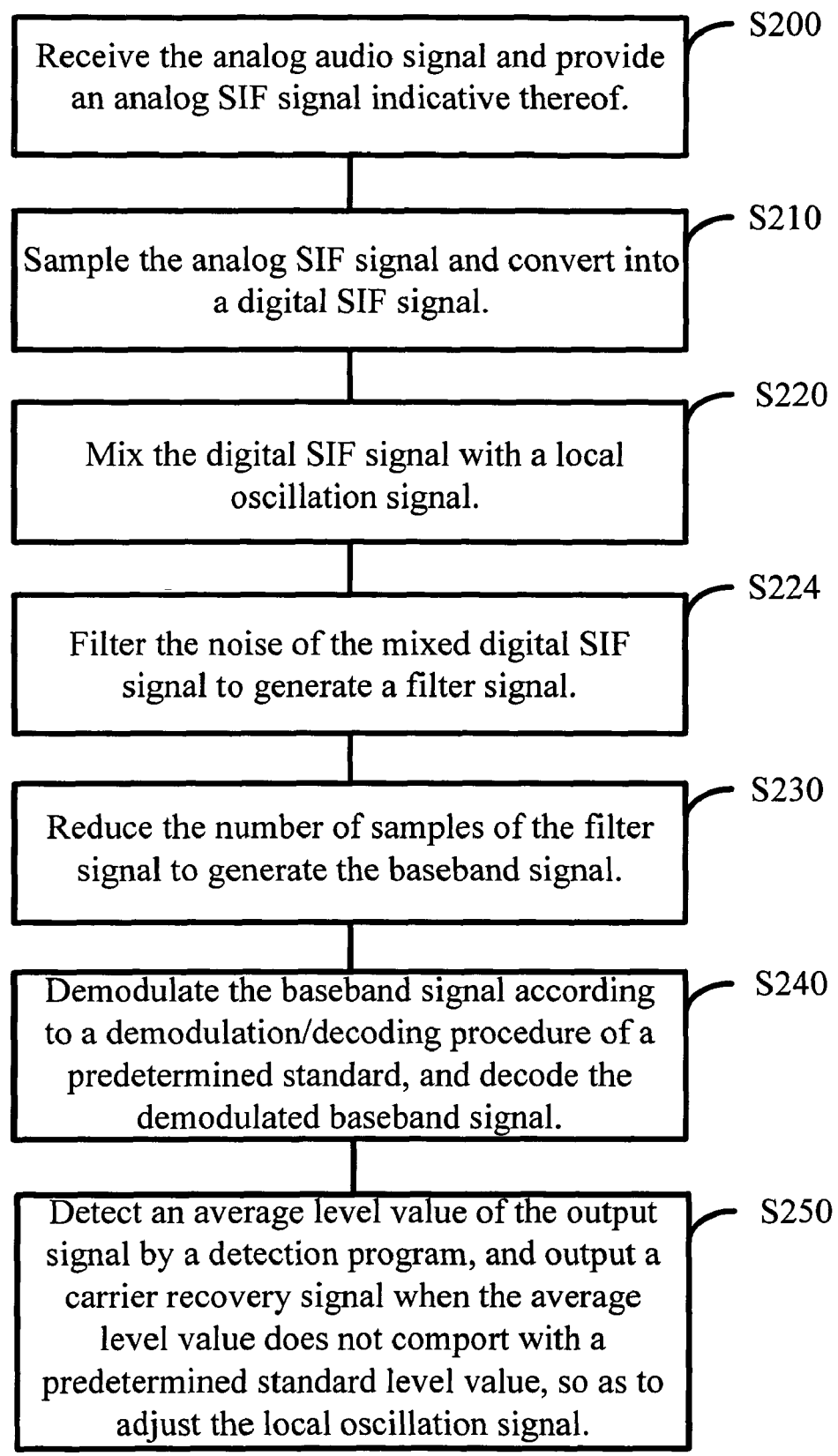
FIG. 8 is a flowchart of the decoding method according to the invention.

Please refer to FIG. 8. FIG. 8 is a flowchart of the decoding method according to the invention. Take the decoding apparatus 40 of the first embodiment shown in FIG. 2 through FIG. 4 as an example; the decoding method of the invention includes the following steps:

S200: Receive the analog audio signal 42 and provide an analog SIF signal 52 indicative thereof. The carrier frequency of the analog audio signal 42 is a first carrier frequency (Cf1). In this embodiment, the range of the first carrier frequency (Cf1) is between 10 MHz and 1 GHz (1000 MHz). The carrier frequency of the analog SIF signal 52 is a second carrier frequency (Cf2). In this embodiment, the range of the second carrier frequency (Cf2) is between 4 MHz and 12 MHz.

S210: Sample the analog SIF signal 52 at a sample rate at least twice as fast as the second carrier frequency (Cf2) and convert the signal into a digital SIF signal 54. The carrier frequency of the digital SIF signal 54 substantially remains at the same frequency as the analog SIF signal 52 (in this embodiment, the frequency is between 4 MHz and 12 MHz). The sample frequency of the digital SIF signal 54 is the first sample frequency (Sf1). The first sample frequency (Sf1) is at least twice the second carrier frequency (Cf2). Therefore, if the range of the second carrier frequency (Cf2) is between 4 MHz and 12 MHz, the first sample frequency (Sf1) is at least 8 MHz.

S220: Mix the digital SIF signal 54 with a local oscillation signal to generate a mixed digital SIF signal 68 and to remove the carrier of the digital SIF signal 54.

S224: Filter the noise of the mixed digital SIF signal 68 to generate a filter signal 70.

S230: Reduce the number of samples of the filter signal 70 to generate the baseband signal 56. The sample frequency of the baseband signal 56 is lower than the digital SIF signal 54. The sample frequency of the baseband signal 56 is the second sample frequency (Sf2). In this embodiment, the second sample frequency (Sf2) is lower than 4 MHz.

S240: Demodulate the baseband signal 56 according to a demodulation and decoding procedure of a predetermined standard, and decode the demodulated baseband signal 82 to output an output signal 58 in compliance with the predetermined standard.

S250: Detect an average level value of the output signal 58 by a detection program 84, and output a carrier recovery signal 60 when the average level value does not comport with a predetermined standard level value, so as to adjust the local oscillation signal to enable outputting of an adjusted baseband signal in the step S230.

In the decoding method of the invention, the demodulation and decoding procedure of the predetermined standard can perform the corresponding demodulation and decoding program 80 on the output signal 58 with a different standard to maintain flexibility for each standard.

Compared with the decoding method for audio signals according to the prior art, the decoding apparatus of the invention and method thereof can perform the corresponding demodulation and decoding procedure on different standards. Therefore, the decoding method of the invention is a decoding method for multiple audio signal standards. Furthermore, the decoding apparatus of the invention has the compensative function for frequency shift.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A decoding apparatus for decoding an analog audio signal, the decoding apparatus comprising:
   an RF tuner for receiving the analog audio signal and providing an analog sound intercarrier frequency (SIF) signal indicative thereof, the carrier center frequency of the analog audio signal is a first carrier frequency, and the carrier center frequency of the analog SIF signal is a second carrier frequency;
   an analog to digital (A/D) converter for sampling the analog SIF signal at a sample rate at least twice the second carrier frequency and converting the analog SIF signal into a digital SIF signal, and the carrier center frequency of the digital SIF signal substantially remaining the same as the second carrier frequency;
   a mixer for mixing the digital SIF signal with a local oscillation signal to remove the carrier of the digital SIF signal and generate a mixed digital SIF signal;
   a filter for filtering the noise of the mixed digital SIF signal to generate a filter signal;
   a digital down sampling device for down sampling the filter signal to generate a baseband signal; and
   a programmable digital signal processor (DSP) for demodulating the baseband signal according to a demodulation procedure of a predetermined standard, and decoding the demodulated baseband signal to output an output signal in compliance with a decoding procedure of the predetermined standard;
   wherein the programmable digital signal processor further outputs a carrier recovery signal to the mixer in order to adjust the local oscillation signal enabling to output an adjusted baseband signal by the digital down sampling device, wherein an average level value of the adjusted baseband signal comports with a predetermined level value.

2. The decoding apparatus of claim 1, wherein the programmable digital signal processor performs the demodulation and decoding procedure of the predetermined standard on the baseband signal by at least one demodulation and decoding program for demodulating the baseband signal, decoding the demodulated baseband signal, and outputting the output signal in compliance with the predetermined standard.

3. The decoding apparatus of claim 2, wherein a corresponding demodulation and decoding program is employed in the programmable digital signal processor according to a different standard in order to maintain flexibility for the different standard.

4. The decoding apparatus of claim 2, wherein the demodulation and decoding program is a broadcast television system committee (BTSC) demodulation and decoding program, and the BTSC demodulation and decoding program comprises:
   an FM demodulation program for demodulating the baseband signal and generating a multichannel television sound (MTS) demodulated signal; and
   a decoding program for decoding the MTS demodulated signal and generating a summed L+R audio output signal and a difference L−R audio output signal.

5. The decoding apparatus of claim 1, wherein the programmable digital signal processor further detects the average level value of the output signal by a detection program, and outputs the carrier recovery signal when the average level value is different from the predetermined level value.

6. The decoding apparatus of claim 5, wherein the programmable digital signal processor performs the demodulation and decoding procedure of the predetermined standard for demodulating the adjusted baseband signal and decoding a demodulated adjusted baseband signal to output the adjusted output signal in compliance with the predetermined standard.

7. A decoding method for decoding an analog audio signal, the decoding method comprising the following steps:
   (a) receiving the analog audio signal and providing an analog sound intercarrier frequency (SIF) signal indicative thereof, the carrier center frequency of the analog audio signal is a first carrier frequency, and the carrier center frequency of the analog SIF signal is a second carrier frequency;
   (b) sampling the analog SIF signal at a sample rate at least twice as fast as the second carrier frequency and converting the signal into a digital SIF signal, and the carrier center frequency of the digital SIF signal substantially remaining the same as the second carrier frequency;
   (c) mixing the digital SIF signal with a local oscillation signal to remove the carrier of the digital SIF signal and to generate a mixed digital SIF signal;
   (e) filtering the noise of the mixed digital SIF signal to generate a filter signal;
   (f) down sampling the filter signal to generate a baseband signal; and
   (d) demodulating the baseband signal according to a demodulation procedure of a predetermined standard, and decoding the demodulated baseband signal to output an output signal in compliance with a decoding procedure of the predetermined standard;
   wherein the step (d) further comprises that outputting a carrier recovery signal in order to adjust the local oscillation signal to enable outputting of an adjusted baseband signal, wherein an average level value of the adjusted baseband signal comports with a predetermined level value.

8. The decoding method of claim 7, wherein the step (d) comprises that performing the demodulation and decoding procedure of the predetermined standard on the baseband signal by at least one demodulation and decoding program for demodulating the baseband signal, decoding the demodulated baseband signal, and outputting the output signal in compliance with the predetermined standard.

9. The decoding method of claim 8, wherein the step (d) performs a corresponding demodulation and decoding program according to a different standard in order to maintain flexibility for the different standard.

10. The decoding method of claim 8, wherein the demodulation and decoding program is a broadcast television system committee (BTSC) demodulation and decoding program, and the BTSC demodulation and decoding program comprises:
    a FM demodulation program for demodulating the baseband signal and for generating a multichannel television sound (MTS) demodulated signal; and
    a decoding program for decoding the MTS demodulated signal and for generating a summed L+R audio output signal and a difference L−R audio output signal.

11. The decoding method of claim 7, wherein the step (d) further comprises that detecting the average level value of the output signal by a detection program, and outputting the carrier recovery signal when the average level value is different from the predetermined level value.

12. The decoding method of claim 11, performing the demodulation and decoding procedure of the predetermined standard for demodulating the adjusted baseband signal and decoding a demodulated adjusted baseband signal to output the adjusted output signal in compliance with the predetermined standard.

* * * * *